No. 840,324.
PATENTED JAN. 1, 1907.
C. G. HAWLEY.
FLEXIBLE FLUID JOINT.
APPLICATION FILED MAY 6, 1905.
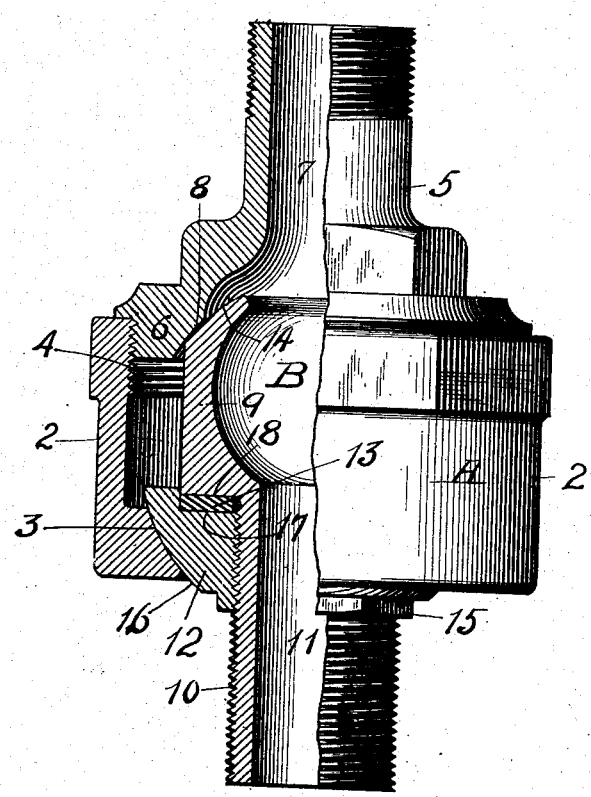
Witnesses:
Inventor

UNITED STATES PATENT OFFICE.

CHARLES GILBERT HAWLEY, OF CHICAGO, ILLINOIS, ASSIGNOR, BY MESNE ASSIGNMENTS, TO THE UNITED STATES FLEXIBLE JOINT COMPANY, OF CHICAGO, ILLINOIS, A CORPORATION OF SOUTH DAKOTA.

FLEXIBLE FLUID-JOINT.

No. 840,324. Specification of Letters Patent. Patented Jan. 1, 1907.

Application filed May 6, 1905. Serial No. 259,191.

*To all whom it may concern:*

Be it known that I, CHARLES GILBERT HAWLEY, a citizen of the United States, and a resident of Chicago, Cook county, Illinois, have invented a certain new, useful, and Improved Flexible Fluid-Joint, of which the following is a full, clear, and exact description, such as will enable others skilled in the art to which it appertains to make and use the same.

My invention relates to flexible joints for various fluids, and particularly for steam and hot water under pressure.

The invention has special reference to improvements in ball-and-socket joints for steam and water pipes or conduits; and the object of the invention is to simplify the construction of ball-and-socket joints and to lessen the cost thereof without loss of efficiency.

My invention consists, generally, in a ball-and-socket joint comprising a ball member and a socket member, each composed of two or more parts having ball-and-socket surfaces, all as hereinafter described, and particularly pointed out in the claims.

The invention will be more readily understood by reference to the accompanying drawing, forming a part of this invention, in which—

A represents the socket member, and B the ball member, of my novel joint. The socket member preferably comprises the cup 2, having a ball-socket portion 3 and provided with an internal thread 4 at its upper end, taken together with a nipple portion 5, having a threaded flange 6, that is screwed into the cup 2. The nipple portion 5 contains a duct 7 and is provided with a partial ball-surface 8. The ball member is composed of three parts, the portion 9, having the long threaded shank 10 and containing the duct 11, the ball portion or ring 12, and the packing-gasket 13. The inner end of the ball portion 9 is provided with a ball surface or end 14 to swing or move in proximity to the ball-surface 8 of the socket member. The members 14 and 8 need not be finished or tooled, as they are merely stops to prevent undue vibration of the ball within the socket. The ring 12 has a polygonal portion 15 and is screwed upon the shank 10. Its ball-surface 16 fits the ball-socket 3 of the socket member. Both portions 9 and 12 are of metal, and I prefer that the portions 2 and 9 shall be of brass and the portion or ring 12 of steel. The upper or inner surface of the ring 12 contains a gasket-recess, and the compressible gasket 13, preferably composed of non-metallic material, is confined between the top surface 17 of the portion 12 and the bottom shoulder 18 of the portion 9. I prefer that the construction shall be such that the part 9 will enter the recess in the ring 12, and thus wholly inclose the packing or gasket 13. The gasket 13 closes the joint between the ball portions 9 and 12, and a tight joint is made between the ball-surfaces and the socket members, pressure of steam or water within the joint operating to hold the ball-surfaces in engagement. This ball-joint is effective, obviates the necessity for non-metallic socket-gaskets, and may be easily dismembered for the purposes of inspection or repair. My joint or coupling possesses the further advantage of not being detrimentally affected by expansion and is also extremely durable.

Having thus described my invention, I claim as new and desire to secure by Letters Patent—

1. A ball-and-socket joint of the class described comprising a substantially cylindrical socket member having a socket-surface at its inner end, in combination with a ball portion having a threaded shank, a ball-ring secured upon said shank, suitable packing between said ball portion and said ball-ring, a nipple having a threaded flange portion adapted to screw in the threaded end of said cylindrical socket member and provided with an internal stop-surface, substantially as described.

2. In a ball-and-socket joint of the class described, a socket member having a ball-socket, 3, at its inner end, and a stop-surface, 8, near its outer end, in combination with a ball portion having a stop-surface at its inner end and provided with a threaded shank, a ball-ring arranged upon said threaded shank and fitting the socket, 3, and suitable packing between said ball portion and said ball-ring, substantially as described.

3. In a ball-and-socket joint of the class described, a socket member containing a duct or cavity and provided with a ball-socket, 3, at its inner end, in combination with a ball portion, 9, having its inner end in proximity to an inner wall of said socket member, said ball portion, 9, having a threaded shank and a shoulder, 18, a ball-ring, 12, screwed upon said shank and provided with a packing-recess, and a gasket or packing, 13, provided in said recess between the ring and the shoulder of said ball portion, 9, substantially as described.

4. A ball-and-socket joint of the class described, comprising the cup portion, 2, having a ball-socket, 3, in its end, in combination with a nipple portion, 5, containing a duct, 7, secured in said cup portion, 2, a ball-ring, 12, fitting the said socket, 3, a ball portion, 9, having a shank, 10, whereon said ring is secured, said ball portion containing a duct, 11, said ball and nipple portions being provided with spherical stop-surfaces 14 and 8, respectively, substantially as described.

In testimony whereof I have hereunto set my hand, this 4th day of April, 1905, at Chicago, county of Cook, and State of Illinois, in the presence of two subscribing witnesses.

CHARLES GILBERT HAWLEY.

Witnesses:
EDWARD E. SILK,
JOHN R. LEFEVRE.